United States Patent [19]

Skendrovic

[11] 4,163,904
[45] Aug. 7, 1979

[54] UNDERSTREAM TURBINE PLANT

[76] Inventor: Lawrence Skendrovic, 402 Glencoe Dr., West Mifflin, Pa. 15122

[21] Appl. No.: 883,382

[22] Filed: Mar. 6, 1978

Related U.S. Application Data

[63] Continuation-in-part of Ser. No. 663,868, Mar. 4, 1976, abandoned.

[51] Int. Cl.² ............... F03B 13/10; F01D 13/00; F16J 15/34; F16J 15/40
[52] U.S. Cl. ..................... 290/54; 415/2; 415/60; 415/122 A; 60/398; 277/27
[58] Field of Search .............. 415/2, 4, 60, 122 A; 417/334–336; 290/43, 54; 60/398; 277/27

[56] References Cited

U.S. PATENT DOCUMENTS

| | | | |
|---|---|---|---|
| 507,294 | 10/1893 | Vance | 417/336 |
| 928,782 | 7/1909 | Morrison | 415/122 A |
| 2,501,696 | 3/1950 | Souczek | 290/43 |
| 3,339,078 | 8/1967 | Crompton | 290/54 |
| 3,487,805 | 1/1970 | Satterthwaite et al. | 415/122 A |
| 3,767,212 | 10/1973 | Ludwig | 277/27 |
| 3,986,787 | 10/1976 | Mouton, Jr. et al. | 290/54 |

FOREIGN PATENT DOCUMENTS 899169  6/1962  United Kingdom ............ 277/27

*Primary Examiner*—John J. Vrablik
*Attorney, Agent, or Firm*—Carothers and Carothers

[57] ABSTRACT

An understream turbine plant is provided for generating electrical power by means of the flow of an understream effluent, such as the Gulf Stream off the Atlantic seaboard coast. Each turbine plant has a large central opening within which is mounted a large turbine impeller. An electrical generator is mounted within the watertight housing of the plant adjacent to the central opening. The opening of the plant has a large diametrical forward entrance and a large diametrical rearward exit with a substantially central portion of smaller diametrical extent. The impeller of the turbine plant is mounted in the smallest diametrical extent of the opening. The contour of the opening provides for a Venturi effect increasing the efficiency of plant operation. A plurality of plants may be provided to span at least a portion of the understream flow, as well as being placed in a stacked arrangement to span at least a portion of the height of the understream flow. Special bearing seals for the rotating impeller prevent the ocean water from entering the interior of the turbine housing.

8 Claims, 6 Drawing Figures

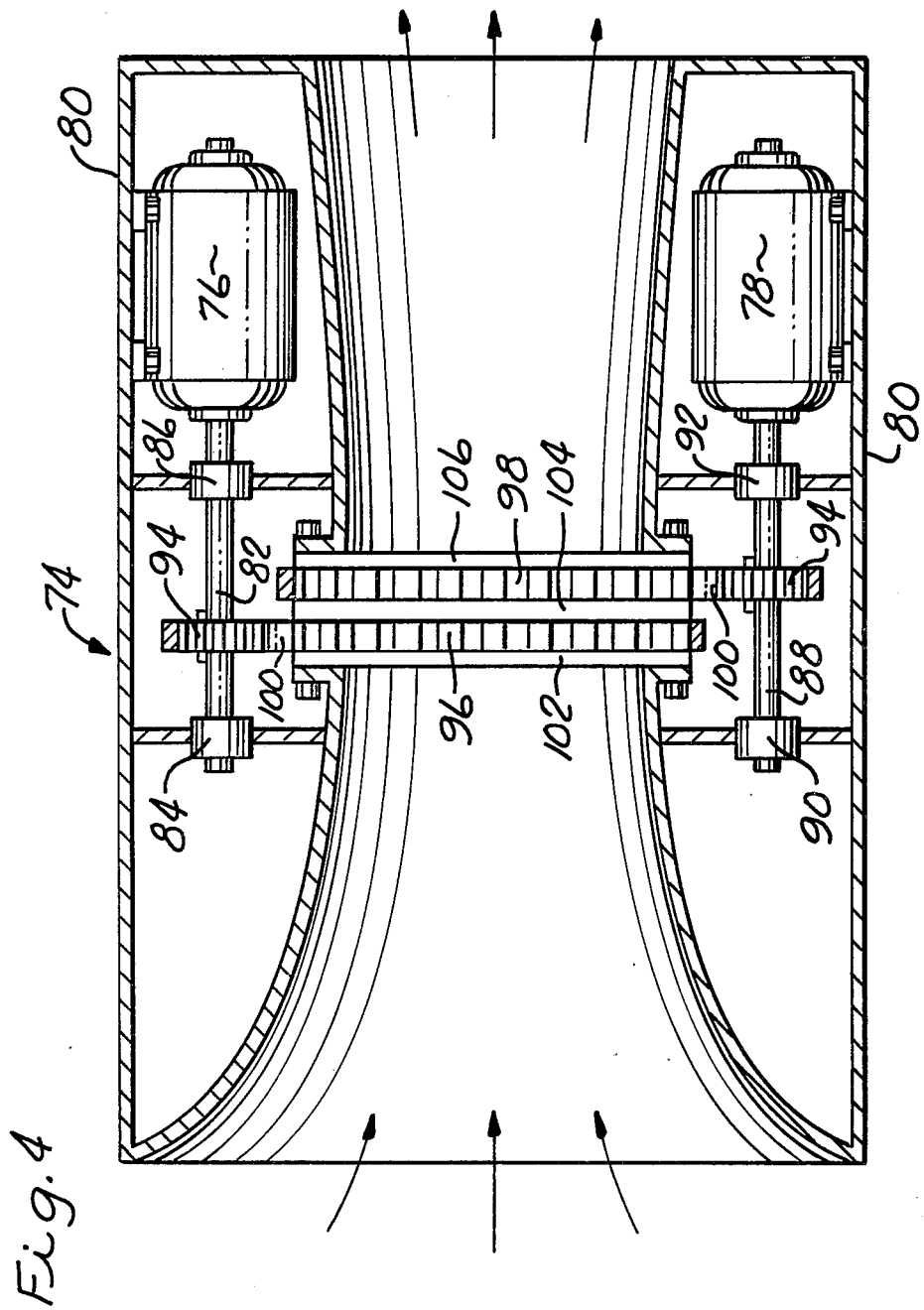

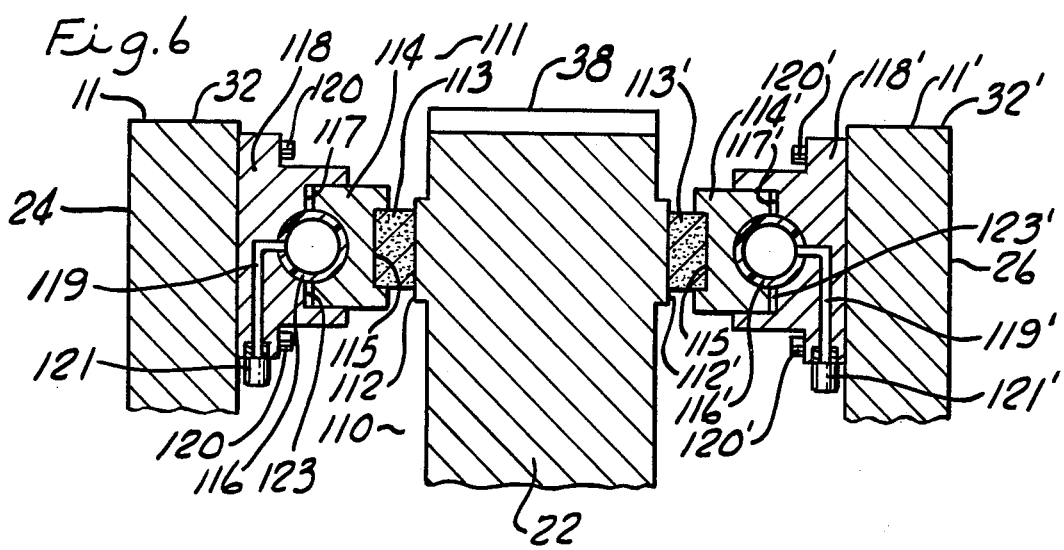

UNDERSTREAM TURBINE PLANT

CROSS REFERENCE TO RELATED APPLICATION

This application is a continuation-in-part of application Ser. No. 663,868 filed Mar. 4, 1976, now abandoned.

BACKGROUND OF THE INVENTION

This invention relates generally to the generation of electrical power through the utilization of natural resources and more particularly to power generation from the flow of large underwater current streams such as the Gulf Stream along the Atlantic seaboard coast of the United States.

The employment of so-called stream turbines capable of generating electrical power from the flowing movement of a stream or river is well known in the art. The most popular type of stream turbines are the type that are anchored to the shores or the bed of the stream to hold fast the generating turbine plant. The turbine plant is suspended in the stream flow. The flow moves through the water wheel or turbine causing rotation of the turbine. The turbine is connected to a coaxial shaft common with an electrical generator. In some cases, a transmission gear is provided between the turbine and the generator. Rotation of the turbine by the water flow causes rotation of the generator producing electrical power. Examples of such turbine plants are U.S. Pat. Nos. 868,798; 1,123,491; and 2,501,696. The turbine plants disclosed in these Patents are designed to be positioned below the surface of the water in the main flow route of the stream or river. Other types are designed to be operative from the surface flow of the stream. In either case, such turbine plants can at best, be employed only in small channels of water, because they are anchored either to the shore or the bed of the water channel. Their use becomes impractical if the means of fastening necessitates long support structures such as cables or rods. Furthermore, such turbine plants become quite impractical when the flow channel becomes quite deep or several miles wide, making it burdensome and costly to provide means by which to anchor the turbine plant.

Thus, these plants have limited utility, as they are confined to natural water courses where simple and inexpensive anchoring of the plant can be achieved.

However, in many cases today, this type of turbine plant with anchoring on the shore or bed is impractical because the plant's being close to the surface of the water channel inhibits navigation by boats.

Another drawback is that in many situations, the flow of such stream or river currents is not of a steady state nature. The flow varies with the amount of water received into the stream from tributaries and from other bodies of water. In dry weather where little rain has occurred, the flow will be reduced, while in heavy rain periods, the flow will increase greatly. In such cases, the generation of useful electric power at useful voltage levels is not practical.

It is the principal object of this invention to provide an understream turbine plant capable of generating power.

Another object of this invention is the provision of a turbine plant adapted for use in deep ocean streams, such as the Gulf Stream, to provide continuous electrical power over long periods of time.

Another object of this invention is the provision of a plurality of understream turbine plants placed in a stacked arrangement to take advantage of the width and height of an underwater stream to provide efficient electrical power generation.

SUMMARY OF THE INVENTION

The present invention is characterized by providing an understream turbine plant adapted to be lowered to the bed of a stream flow, such as the Gulf Stream. The plant is of sufficient weight to hold it in position in the stream bed, although anchor cables may be provided. The base of the plant is constructed of concrete to provide for weight and maintain the plant in an upright position. An opening is provided through the center of the plant. Midway of this central opening, there is provided a water sealed impeller which is rotatable by means of the understream currents. The impeller is of large diameter and is adapted to drive a chain or other flexible driving device about the periphery of the impeller. The chain is coupled to rotate a smaller gear attached to the drive shaft of an electrical generator.

The impeller blades are fin-shaped and are connected at their outer ends to a large diameter ring which is housed on suitable bearings in watertight environment. The impeller lades may have greater width at their outer ends. They may also have a slight spiral shape from their inner end to their outer end, for greater rotational efficiency.

The opening through the central portion of the turbine plant is provided to have a large diameter at the forward and rearward ends with the smallest diametrical extent of the opening being at the impeller, creating a Venturi effect at this point. In the preferred form, the rate of decrease in diametrical size is greater between the forward end of the opening and the impeller section than compared to that between the rearward end and the impeller section.

A deflector grid may be connected to the forward end of the plant to prevent large fish and objects from entering the turbine plant. The grid may have large openings, however, to permit the passage of smaller fish, as they can easily pass between the spacing of the slow moving impeller blades.

Novel bearing seal means are provided to engage the impeller and seal the interior of the housing of the turbine from the exterior liquid to protect the generator and other parts within the housing from the corrosive effects of the ocean water. This bearing seal means includes a smooth annular bearing surface on each side of an outer ring member making up the periphery of the impeller. A pair of annular bearing rings respectively annularly engage these bearing surfaces, and these bearing rings are, in turn, supported annularly with respect to the housing. An annular resilient seal is annularly disposed under compression between the housing and at least one of these supports to provide a liquid seal between the support and the housing and to also continuously urge the bearing ring members into sealed bearing engagement with the side annular bearing surfaces on the outer ring member of the impeller. This annular resilient seal means preferably consists of an inflatable continuous annular tube which may be pre-inflated to the prescribed pressure.

BRIEF DESCRIPTION OF THE DRAWINGS

Other objects and advantages appear in the following description and claims.

The accompanying drawings show, for the purpose of exemplification without limiting the invention or the claims thereto, certain practical embodiments illustrating the principles of this invention wherein:

FIG. 4 is a sectional side view of another embodiment of the turbine plant.

FIG. 6 is a partial view in vertical section of the bearing seal means utilized in the turbine plant of the present invention to seal the interior of the turbine housing from ocean water.

DESCRIPTION OF THE PREFERRED EMBODIMENT

Figure 1:
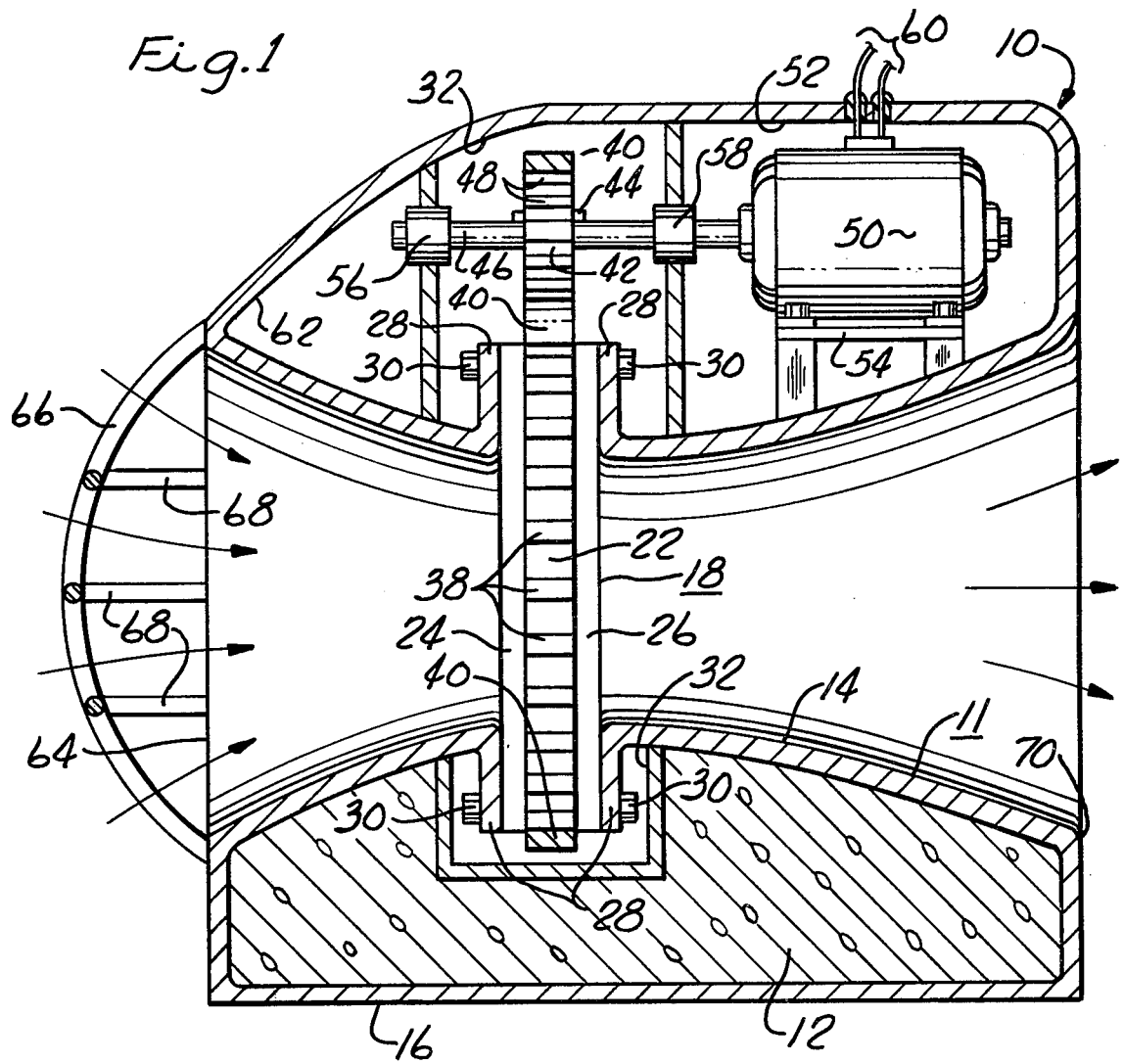
FIG. 1 is a sectional side view of the turbine plant comprising this invention.
Figure 2:
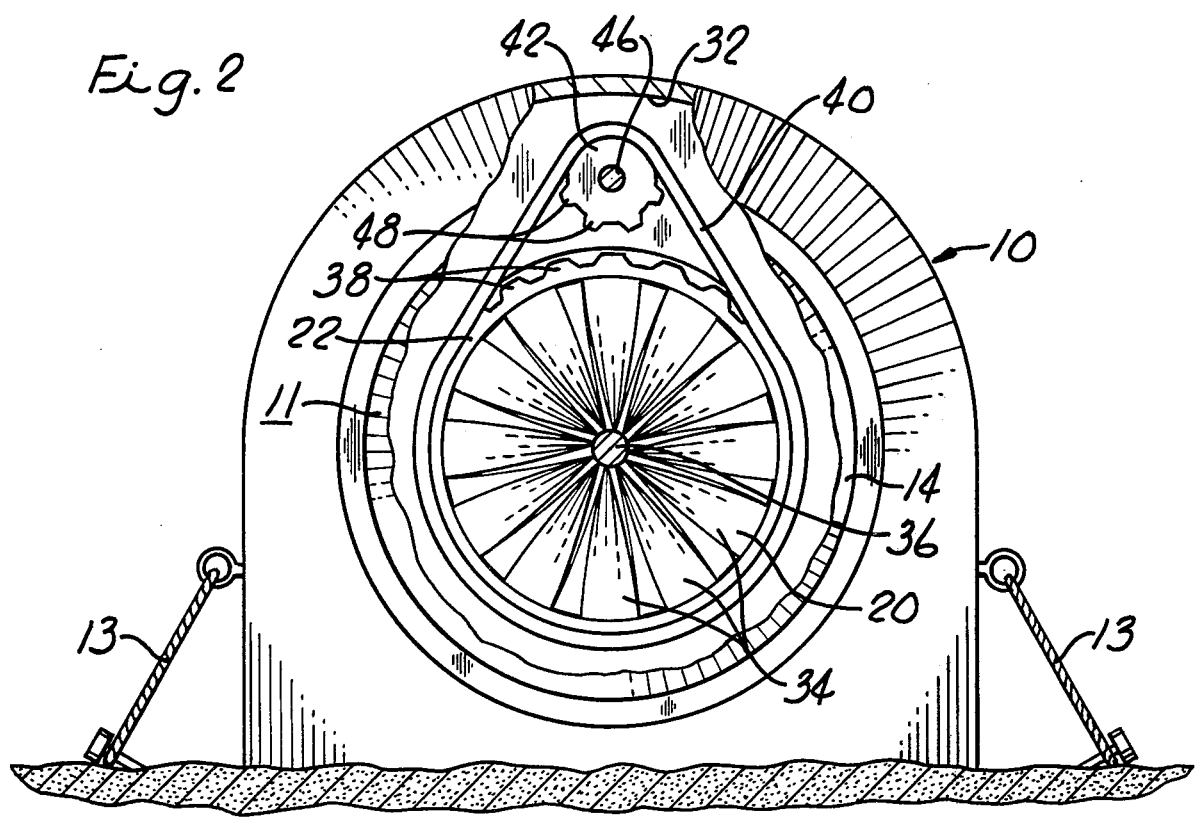
FIG. 2 is a forward end view in partial section of the turbine plant of FIG. 1 with the part in section showing the impeller arrangement.

Referring to FIGS. 1 and 2, the turbine plant 10 is provided with a heavy base 12 constructed of or filled with concrete to provide weight. The concrete base 12 holds the plant 10 in a stationary manner when the plant is placed on the ocean understream bed. The heavy base 12 also prevents the plant 10 from shifting or falling over due to strong ocean stream currents. If desired, the plant 10 may be anchored to the ocean understream bed by means of suitable cable or rod anchors 13 shown in FIG. 2. Plant 10 may also be suspended in the ocean understream above the ocean floor.

The central axial opening 14 of the turbine plant 10 may be a non-corrosive housing 11, the concrete 12 being poured into the base 16 of the housing.

The impeller section 18 is of large diameter and is positioned in the center portion of the opening 14. For example, the diameter of the impeller 20 may be 100 feet. The impeller section 18 includes an outer ring 22 supported for rotation by means of suitable roller bearings (not shown) in the outer race supports 24 and 26. The race supports 24 and 26 are secured to the support flanges 28 of the housing 11 by means of fastening members 30, which may be large bolts and nuts. The race supports may also be secured to the flanges 28 by suitable welding methods.

The outer ring 22 of the impeller section 18 is actually the inner race of the bearing structure. This structure is provided with appropriate seals to seal the bearings from the water flow and maintain annular chamber 32 watertight.

Figure 5:
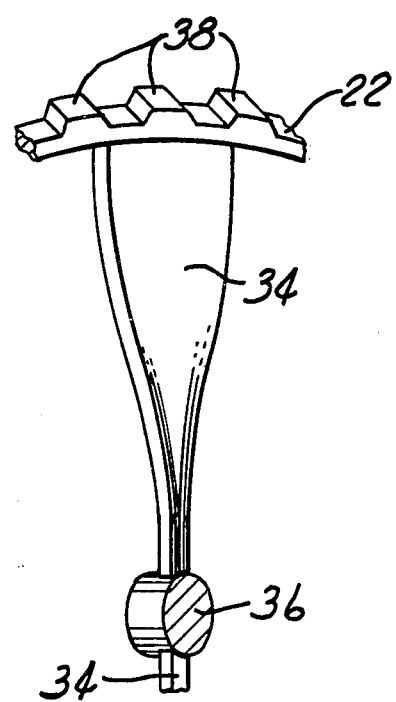
FIG. 5 is a perspective showing of a single impeller of the turbine plant.

In FIGS. 2 and 5, there is shown the details of the impeller blades 34. Each of the impeller blades 34 has its outer end secured by welding methods, for example, to the inner annular surface of the outer ring 22. The inner ends of the impeller blades 34 are secured to the hub 36. The blades 34 are wider at their outer ends and may be slightly spiral along their radial extent from hub 36 as depicted in FIG. 5.

The outer surface of the ring 22 is provided with gear teeth 38. The gear teeth mesh with corresponding slots provided on the inner surface of the chain belt 40. The flow of the stream current causes the impeller to rotate which drives the chain belt 40. The chain belt drives the sprocket 42 secured by key 44 to the generator drive shaft 46. The outer surface of the sprocket 42 has a series of gear teeth 48 that match corresponding slots provided in the chain belt 40.

As shown in FIG. 1, the electrical generator 50 is supported in a watertight chamber 52 in the upper portion of housing 11. The generator 50 may be supported by any suitable means in the chamber 52 such as secured to the platform 54. The shaft 46 of generator 50 is rotatably supported by means of suitable bearing supports 56 and 58 within the housing structure.

The generator 50 may be of the alternator type for generating alternating current or may be a direct current generator. Direct current may be found preferable for the purpose of preventing harm to the natural sea life due to the electric fields surrounding the conductors leading to the surface. Connection leads 60 connect the electrical output of generator 50 to an electrical substation on the ocean surface or on the land where the electrical power may be distributed for electrical consumption. The turbine plant 10 of this invention would be quite suitable for generation of electrical power for a sea platform.

The watertight chamber 62 at the forward end of the upper portion of the housing 11 may be utilized for housing measuring instruments (not shown) to measure the rate of flow of the understream as well as measure changes in water temperature.

The forward end 64 of the turbine plant is provided with a grid 66 to prevent the entry of large fish or other large objects into the opening 14. The impeller blades 34 are spaced apart to permit the passage of small fish, as the impeller will not be rotating at a high rotational velocity sufficient to cause injury to passing small fish. Thus, the grid bars 68 can be spaced apart at fairly large distances so as not to interfere with the ocean current operative on the impeller 20.

The opening 14 is horn-shaped at either end with the impeller section 18 being at the narrowest diametrical portion of opening 14. The rate of decrease in diametrical extent is greater between the forward end 64 and the impeller section 18 than compared to the rate of decrease between the rearward end 70 and the impeller section 18. This shape in the opening 14 provides for a Venturi effect aiding the rotational movement of impeller 20 and providing for maximum efficiency.

Figure 3:
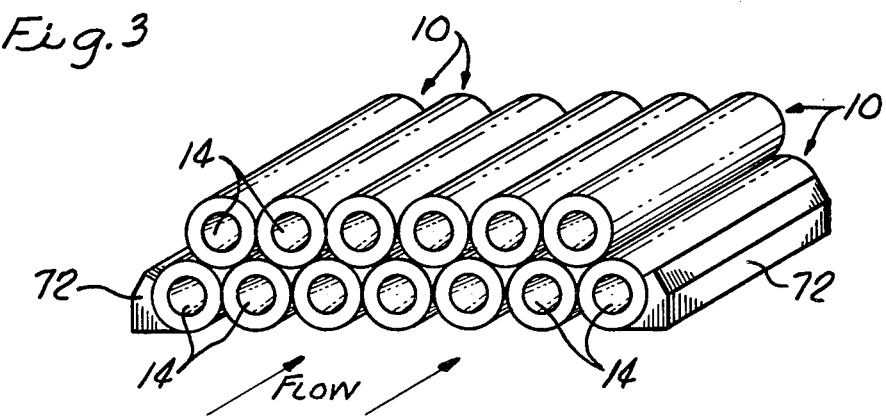
FIG. 3 is a schematic illustration of employing a plurality of turbine plants of FIG. 1 on the bottom or bed of the ocean understream.

Reference is now made to the diagrammatic representation of FIG. 3. The turbine plants 10 may be stacked to form an arrangement of plants which are positioned across the ocean stream to take advantage, as practically as possible, of the stream flow as a means of electrical power generation. Side anchors 72 may be provided to maintain the plants 10 in stacked relation and prevent outward lateral movement of the lowermost turbine plants.

It will be noted in FIG. 3 that the outer contour of each of the turbine plants 10 is substantially cylindrical. This provides for ease of stacking on the ocean floor in the structurally sturdy arrangement shown in FIG. 3.

The placing of the turbine plants on the ocean floor or bed may be accomplished with surface or ship cranes, and properly positioned individually or in stacked groups.

FIG. 4 shows a turbine plant 74 quite similar to the turbine plant 10. Plant 74, however, is of a more cylindrical shape for stacking, as shown in FIG. 3, and also includes two electrical generators 76 and 78 rather than one as shown in FIG. 1. Each generator 76 and 78 is secured by suitable means to the cylindrical housing wall 80. Generator 76 has its drive shaft 82 supported in suitable bearings 84 and 86. Drive shaft 88 is supported in suitable bearings 90 and 92.

A sprocket 94 is secured to each drive shaft 82 and 88 in alignment with a respective outer ring 96 and 98, of the dual drive arrangement. This arrangement is quite similar to the impeller 20 of FIG. 1, except that two sets of gear teeth 38 are provided for the structure shown in FIG. 4. The race supports 102, 104 and 106 support the impeller for rotational movement and provide a watertight seal against the intrusion of water into the housing interior.

The impeller drives the respective outer rings 96 and 98 which, in turn, drive the shafts 82 and 88 of generators 76 and 78 via drive belts 100 in a manner identical to the arrangement shown in FIG. 1.

As in the case of the turbine plant 10, the dual turbine plant 74 has a central opening shaped to provide a Venturi effect thereby increasing the velocity of flow through the dual impellers and utilizing the understream flow to maximum efficiency.

The potential use of turbine plants 10 and 74 can be illustrated with regard to the Gulf Stream off the Atlantic seaboard. The Gulf Stream is generally 50 miles wide, and 3,000 feet deep. The maximum flow rate is about 5.7 miles per hour. This flow rate is approximately 1000 times more than that of the Mississippi River.

The flow of the Gulf Stream is quite regular compared to the flow of surface streams and rivers. The flow rate may vary from 2 to 6 miles, but generally is around 5 miles per hour. It is estimated that for a maximum flow rate of 5.7 miles per hour, the turbine plant having an impeller of 100 feet in diameter and a corresponding generator shaft sprocket of 5 feet in diameter (providing a gear ratio 20:1), water will pass through its opening at the rate of approximately 12,480,000,000 gallons per minute. At this gear ratio and flow rate, it is estimated that one power plant could generate up to 0.7 kilowatts per square yard of cross section of the Gulf Stream. However, by providing a proper Venturi opening in the generator plant, the power output of the plant could be increased quite substantially because of the large increase in flow rate through the plant.

Referring next to FIG. 6, an embodiment of the novel bearing seal means is illustrated. This bearing seal engages the rotating outer impeller ring 22 and prevents the flow of ocean water from the exterior 110 to the interior 111 in chamber 32 of housing 11.

The bearing seal arrangement includes two smooth annular bearing surfaces 112 and 112' on opposite sides of the outside impeller ring 22. These bearing surfaces 112 and 112' are machined and polished to provide a good bearing seal seat. A pair of annular bearing rings 113 and 113' are respectively positioned to annularly engage bearing surfaces 112 and 112'. Bearing seal rings 113 and 113' are continuous ring members made of graphite or of any other suitable bearing seal material.

The bearing seal rings 113 and 113' are respectively held in position by back-up support rings 114 and 114'. Graphite rings 113 and 113' are respectively received in cooperative snug engagement in annular seating grooves 115 and 115' of ring back-up supports 114 and 114'. Resilient seal means are annularly disposed under compression between the housing 32 and the annular supports 114 and 114' to provide a liquid seal therebetween and to also continuously urge bearing rings 113 and 113' into sealed bearing engagement with the respective bearing surfaces 112 and 112'.

These annular resilient seal means are provided by the inflated and continuous annular elastic tubes 116 and 116'. As may be seen from the Figure, ring back-up supports 114 and 114' are in turn slidably supported in annular grooves 117 and 117' of annular base supports 118 and 118'. These annular back-up supports 118 and 118' are in turn respectively secured by bolts 120 and 120' to brace or bearing supports 24 and 26 in a watertight manner.

The annular resilient seal members 116 and 116' are tubes manufactured of rubber, plastic or other resilient material which is not readily corrosive to salt water conditions. These annular tubes 116 and 116' are cooperatively received in opposed mating annular grooves in supports 114 and 118 for tube 116 and in supports 114' and 118' for member 116'.

The annular tubes 116 and 116' are internally inflated with a fluid such as air, water, or hydraulic fluid via tubes 119 and 119' and their check valve entry nipples 121 and 121' respectively.

The amount of fluid pressure maintained within annular tubes 116 and 116' is determined upon the depth at which the turbine plant is lowered under the ocean surface and on the amount of pressure that is required to continually urge bearing seal rings 113 and 113' against their corresponding bearing surfaces 112 and 112' in order to maintain a continuous liquid seal, even though the graphite bearing rings 113 and 113' will continuously wear thinner.

It may be observed that in this fashion, no sea water can escape into the interior of the turbine housing through the expansion gaps 123 and 123' as the annular resilient seal rings 116 and 116' are always maintained under compression sufficient to provide a good liquid seal even though the turbine plant may be positioned many feet under the ocean surface at great pressures, and no leaks will develop either between the graphite bearing rings 113 and 113' and their corresponding annular bearing surfaces 112 and 112' on the outside annular ring member 22 of the impeller.

It should also be recognized that instead of air or hydraulic fluid the expansible resilient seal members 116 and 116' may also be inflated with sea water under pressure. It should also be realized that passages or tubes 119 and 119' provided for this purpose may be provided with self-adjusting or compensating means to automatically compensate for pressure change within resilient seal members 116 and 116'. Strain gauges may be provided to sense the level of pressure within the resilient seal members 116 and 116' and when minimum predetermined pressures are obtained, the circuitry within the housing of the turbine unit is energized to permit flow of fluid under pressure contained within pressure cylinders housed within the turbine housing into the inflatable seal members to bring them up to pressure. In fact, an electrical line may run with conductor line 60 all the way to the ocean surface for continuous monitoring of the pressure within the resilient seal members as sensed by the strain gauges. It is further obvious that other indicating means may be supplied to indicate the degree of wear and the effectiveness of the liquid seal in the bearing seal means illustrated in FIG. 6 for surface monitoring. When it is discovered that major repair is required for any one turbine plant, the unit may be easily raised to the surface of the ocean by means of its buoy marker and tow cable for temporary repairs.

I claim:

1. An understream turbine plant for generating electrical power by means of the flow of a large understream effluent comprising a large housing having a large water flow passage therethrough, a single impeller mounted within said passage in a plane transverse thereto and adapted to drive an electrical generator mounted in said housing and sealed from exterior liquid contact, said impeller including a plurality of impeller blades mounted at their inner ends to a hub and radially extending therefrom in said plane and secured at their outer ends to the inner surface of a ring member, said ring member rotatably mounted in bearings and in bearing seal means sealing the interior of said housing from said exterior liquid, drive coupling means engaged with said ring member and said generator to drive said generator by means of understream effluent passing through said opening, means to mount said housing in an ocean understream effluent such as the Gulf Stream with said passage aligned with the flow of said understream, insulated conductor means connected to said generator and passing in a sealed through said housing to conduct electricity from said generator to a location above an ocean surface, said bearing seal means including a smooth annular bearing surface on each side of said ring member, a pair of annular bearing rings respectively annularly engaging said bearing surfaces, support means annularly supporting each of said bearing rings to said housing, and annular resilient seal means annularly disposed under compression between said housing and at least one of said support means to provide a liquid seal therebetween and continuously urging said bearing rings into sealed bearing engagement with said bearing surfaces.

2. The turbine plant of claim 1 wherein said annular resilient seal means consists of an inflated continuous annular tube.

3. The turbine plant of claim 1 including two of said annular resilient seal means respectively backing up both of said support members.

4. The turbine plant of claim 1 wherein said opening is shaped to provide a Venturi effect, said impeller being mounted at the smallest diametrical extent within said opening.

5. The turbine plant of claim 1 wherein two electrical generators are mounted within said housing and driven by said impeller.

6. The turbine plant of claim 1 wherein a grid is secured to the forward entrance of said passage to prevent the passage of large objects into said passage, the passages in said grid being sufficiently large so as not to interfere with the flow of the understream effluent.

7. The turbine plant of claim 1 wherein said drive coupling means includes a gear sprocket secured to a drive shaft of said generator, a gear surface provided on the outer surface of said ring member, a drive belt coupling said ring member to said drive shaft sprocket.

8. The turbine plant of claim 7 wherein the gear ratio of said ring member to said sprocket is 20:1.

* * * * *